INTER-REGISTER SIGNALLING FOR ELECTRONIC TELEPHONE SYSTEM

Filed April 13, 1962 4 Sheets-Sheet 1

INVENTORS
NILS HERBERT EDSTRÖM
KURT KATZEFF
BY Hane and Nydick
ATTORNEYS

INTER-REGISTER SIGNALLING FOR ELECTRONIC TELEPHONE SYSTEM

INVENTORS
NILS HERBERT EDSTRÖM
KURT KATZEFF
BY Hane and Nydick
ATTORNEYS

INTER-REGISTER SIGNALLING FOR ELECTRONIC TELEPHONE SYSTEM

Filed April 13, 1962 4 Sheets-Sheet 3

INVENTORS
NILS HERBERT EDSTRÖM
KURT KATZEFF
BY Hane and Nydick
ATTORNEYS

INTER-REGISTER SIGNALLING FOR ELECTRONIC TELEPHONE SYSTEM

Filed April 13, 1962 4 Sheets-Sheet 4

INVENTORS
NILS HERBERT EDSTRÖM
KURT KATZEFF
BY Hane and Nydick
ATTORNEYS 3,231,677

INTER-REGISTER SIGNALLING FOR ELECTRONIC TELEPHONE SYSTEM

Nils Herbert Edström, Hagersten, and Kurt Katzeff, Bandhagen, Sweden, assignors to Telefonaktiebolaget L M Ericsson, Stockholm, Sweden, a corporation of Sweden
Filed Apr. 13, 1962, Ser. No. 187,391
Claims priority, application Sweden, Nov. 1, 1961, 10,870/61
2 Claims. (Cl. 179—18)

The present invention refers to an arrangement for checking whether a correct digit signal has been received in an electronic telephone system in which digit signals stored in a register are sent to a receiving register by means of a voice frequency code and in which each digit code consists of a numbr of voice efrquencies each selected within its series of different voice frequencies.

In conventional systems for digit signalling in a telephone system a calling signal is sent to the digit receiving means. The latter sends a receiving signal as a sign that it is in the ready state, whreupon sending can begin. The length of the signals has to be selected with a broad margin in view of the variations in the characteristics of the network and the length of the signal has to be measured in order to ensure that a calling signal may be distinguished from a digit signal. The length of the answering signal has also to be measured in the sending exchange. This implies that the time for sending a digit signal will be relatively long. Furthermore in conventional systems there is no direct confirmation that the correct digit signal has been received.

The present invention refers to a signalling system in which measuring of the length of the signals or an additional calling or acknowledging signal is not necessary and where the information transfer is carried out by means of a sustained voice frequency signal which remains on the line until the receiving means has been influenced and has sent an answering signal. Thus signalling is always carried out at the greatest speed allowed by the characteristics of the network without the necessity of awaiting signals of definite length and furthermore a digit check is possible to ensure that the correct digit signal has been received.

The arrangement according to the invention is substantially characterized by the fact that the receiving register is provided with means which, upon receiving the digit code, will send an acknowledgment of the digit code received to the sending register, which code is formed tin such manner that in a series which can be formed by the voice frequencies of each of the groups, the acknowledgment signal is situated as far from one end of the series as the original signal is situated from the other end of the series, the sending register comprising means for checking that the signal obtained from the receiving register is an acknowledgment of the signal sent and dependent on the check result influences the continuation of the digit sending.

Figures 1, 2, 3:
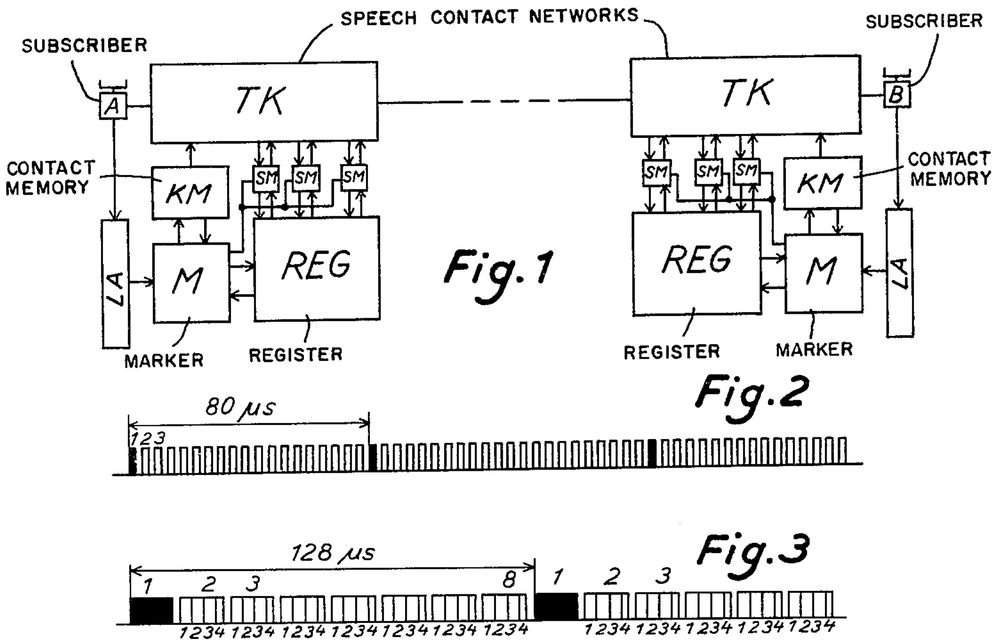
Figure 5A:
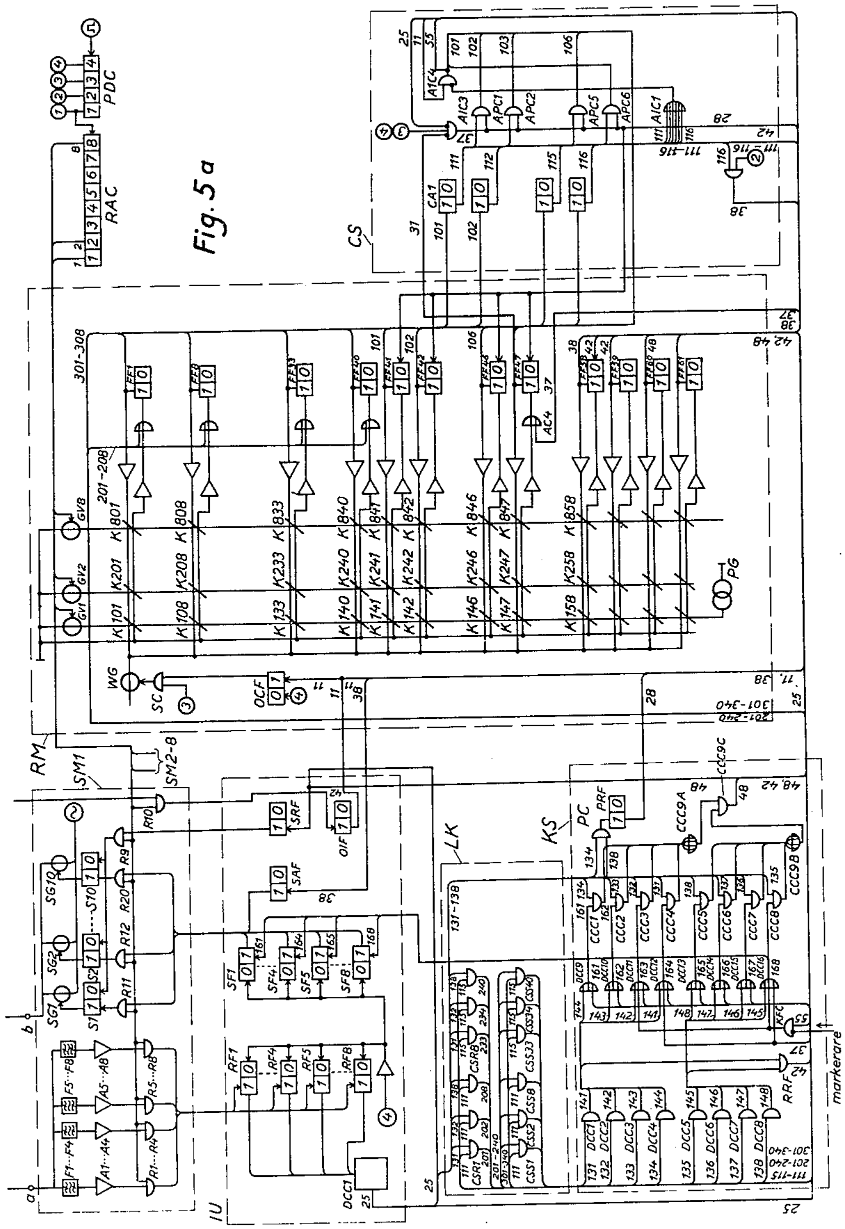
Figure 5B:
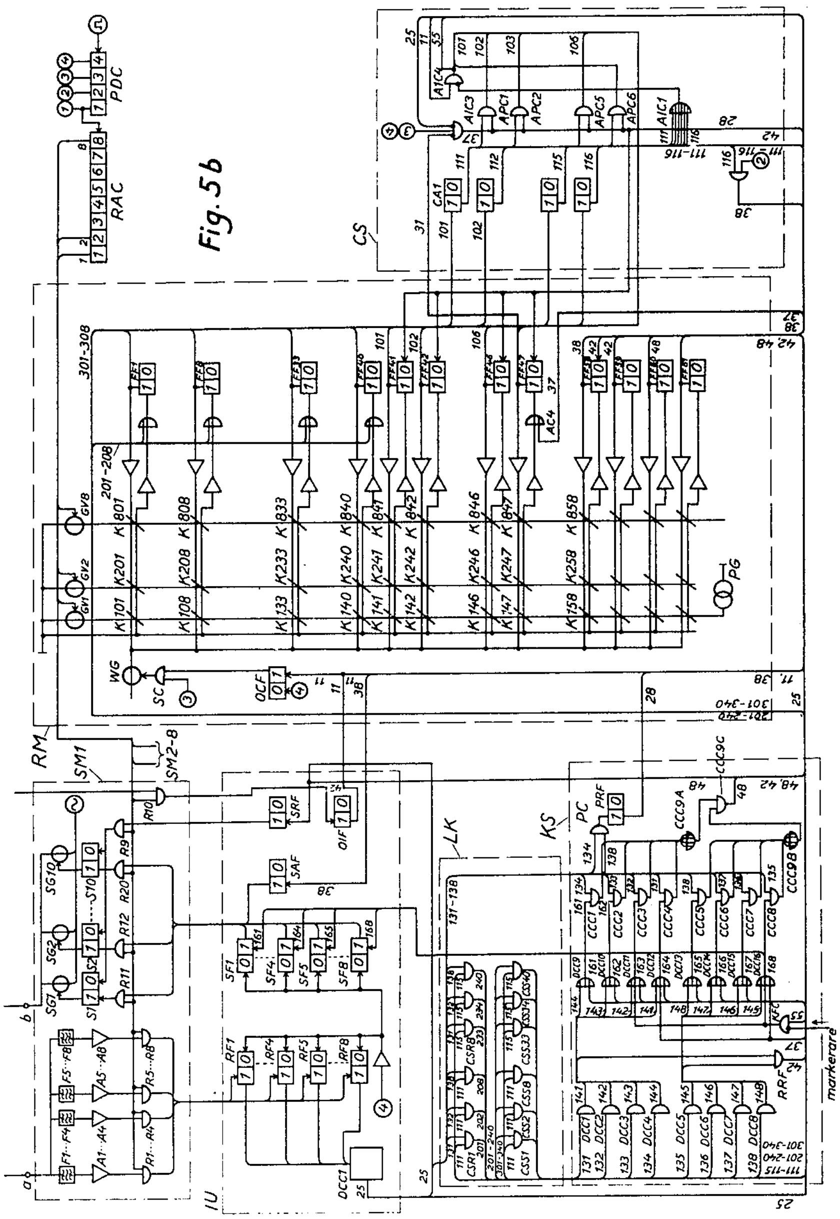
Figure 6A:
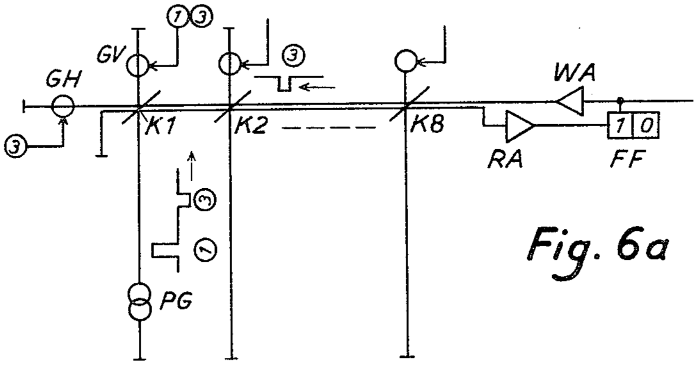
Figure 6B:
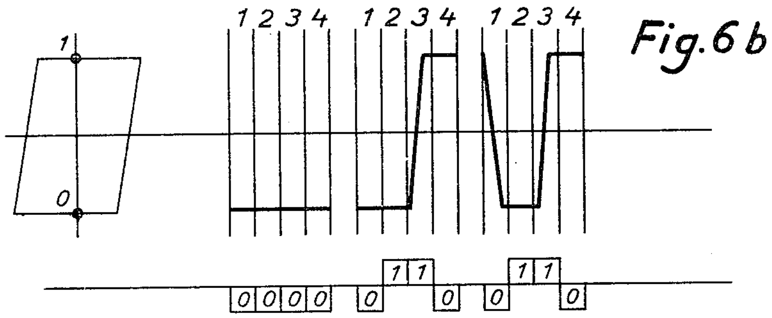
Figure 7:
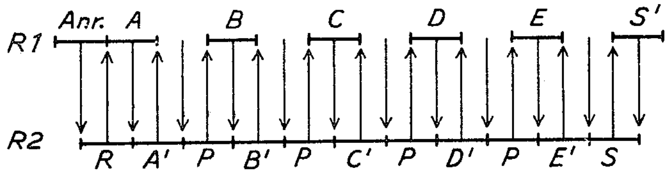

The invention will be explained more in detail by means of an embodiment showing how the invention is applied to an electronic telephone system of the time division multiplex type. FIG. 1 shows in the form of a block diagram two telephone exchanges, between the registers of which digit signalling will be carried out. FIG. 2 is a diagram which shows the speech pulse positions in the telephone system in question, FIG. 3 is a diagram which shows the different pulse positions in which the register is influenced, FIG. 4 is a block diagram of a register together with the sender register unit belonging to it, FIG. 5*a* and 5*b* show logic diagrams of a sending and a receiving register respectively, FIG. 6*a*, 6*b* show the principle of writing and reading out in a register and FIG. 7 shows diagramatically the process of signalling.

FIG. 1 is a block diagram showing two substantially identical electronic telephone exchanges of the time division multiplex type, between which signalling according to the invention will be carried out through a four-wire connection. Two subscribers connected to the respective exchanges are designated by A and B respectively, a speech contact network which comprises a number of individual contacts is designated by TK. Said contacts are actuated each in its speech pulse position (FIG. 2), so that by operating individual contacts of two subscribers in the same pulse position and in this manner connecting them to a common conductor during said pulse position, a speech connection will be obtained between the subscribers in known manner. In the embodiment in question there are 20 speech pulse positions as shown in FIG. 2, the length of the pulses is 4 μsec. and the repetition period is consequently 80 μseconds. Connection between a register and a subscriber or between two registers respectively is set up in the same manner through the individual contacts of the register in a selected pulse position. The contacts of the speech contact network TK are operated by means of periodical pulses which are obtained from a contact memory KM in code form. The contact memory consists of a number of magnetic cores which represent a record in the form of a code and the information concerning the contacts which have to be closed or interrupted respectively is written and cancelled respectively by the marker M. The purpose of the marker is to determine by means of a line scanner LA the multiple position and cradle contact state of the subscribers and to select an idle pulse position for two subscribers, two registers or a subscriber and a register, and to write the number of the contacts into the contact memory KM in the respective pulse position. The arrangement described hereabove is known before and is not an object of the present invention. Each register REG consists of a number of memory groups, according to the embodiment 8, and by means of voice frequencies receives signals each through its signalling unit SM and the digit signals received are recorded in the memory groups in the form of a code by switching magnet cores. To each of the memory groups belongs a register pulse position in which the respective memory group and the signalling unit belonging to it are activated. According to the embodiment each of the 8 register pulse positions has a 16 μsec. duration, so that the same memory unit is scanned at 128 μsec. intervals as shown in FIG. 3. Each register pulse position consists of 4 pulses of 4 μsec. duration which determine the processes of writing in and reading out as will subsequently be explained in greater detail.

Figure 4:
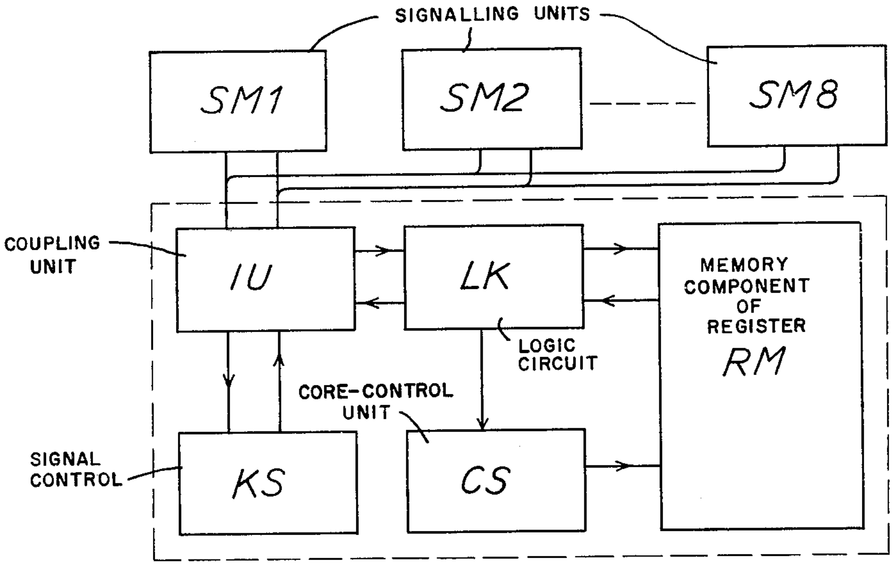

FIG. 4 shows the most important details of a register together with a number of signalling units SM1–8 connected to the register. By IU is designated a unit comprising the means which implement the co-operation between the register and the signalling units SM, by RM is designated the memory part of the register in which the information is recorded and read out respectively, CS designates the means which control the writing and reading functions which effect the right sets of cores in RM, LK designates a logic circuit which supervises the co-operation between the means in IU and the memory part RM, and KS designates the means which effect the acknowledgment signalling according to the invention. The function of the different means will be explained in greater detail.

The table herebelow shows the frequencies of the different digit signals used in signalling between the registers:

| Frequencies Hz. / Acknowledgment | Digit code | | | | | | | | Auxiliary code | | | | | | | |
|---|---|---|---|---|---|---|---|---|---|---|---|---|---|---|---|---|
| | 1<br>16 | 2<br>12 | 3<br>0 | 4<br>15 | 5<br>9 | 6<br>8 | 7<br>14 | 8<br>6 | 9<br>5 | 0<br>3 | 11<br>13 | 12<br>2 | 13<br>11 | 14<br>7 | 15<br>4 | 16<br>1 |
| 1. 1020 | x | x | x | | | | | | | | | | x | | | |
| 2. 1140 | | | | x | x | x | | | | | | | | x | | |
| 3. 1260 | | | | | | | x | x | x | | | | | | x | |
| 4. 1380 | | | | | | | | | | x | x | x | | | | x |
| 5. 1620 | x | | | x | | | x | | | | x | | | | | |
| 6. 1740 | | x | | | x | | | x | | x | | | | | | |
| 7. 1860 | | | x | | | x | | | x | | | x | | | | |
| 8. 1980 | | | | | | | | | | | | | x | x | x | x |

A connecting operation is described with reference to FIGS. 5*a* and 5*b*, of which the first mentioned figure shows a logic diagram of a sending register and the second figure shows a logic diagram of a receiving register together with a signalling unit SM for receiving and sending digit signals. According to the embodiment 8 signalling units SM co-operate each with its own memory group in a register. The diagrams according to FIGS. 5*a* and 5*b* are identical but in the connecting operation certain parts will participate only in one of the registers and other parts only in other register. Only such parts are shown which are necessary for explaining the fundamental function of the register while further means which are necessary for the practical function of the register, e.g. different control- and security devices without which the fundamental function very well can be explained, have been dispensed with.

FIGS. 5*a* and 5*b* show more in detail one of the signalling units SM, the in and outlet port IU which cooperates with the signalling units SM, the core memory RM in which the digit information is stored, the means CS which controls the feeding of the information to and form the core memory in such manner that the cores in the core group or cell intended are influenced, herebelow also called cell control, the section KS for complement signalling which is the proper object of the invention, and the logic circuit LK which controls the co-operation between said parts.

As mentioned before voice frequencies signals are received and sent through the signalling unit SM comprising 8 band pass filters F1–F8 each of which is tuned to its definite voice frequencies and can receive voice frequencies signals in a 1 of 4 plus 1 of 4 code. Furthermore the signalling unit SM comprises 10 bistable switches S1–S10 with their gate circuits G1–G10 which are operated by the 1-state of the switches so that they can allow one of the 10 voice frequencies to pass from the voice frequencies generator TG. Of said gate circuits 8 are provided for sending voice frequencies signals to the 1 of 4 plus 1 of 4 code, one is provided for sending a dial tone to a subscriber and one for sending a calling signal to another register. The signals from the receiving part of the SM-unit pass through AND-circuits R1–R20, the other condition of which is that they obtain a scanning pulse from the register, corresponding to the register pulse position of the respective signalling unit. As mentioned before each register pulse position is divided into 4 periods, each of which has a length of 4 $\mu$sec. The signalling unit SM is activated during the three first periods while the fourth period is used for restoring all bistable switches.

When digit signals are received from e.g. a calling subscriber, a signal will appear on 2 of the 8 wires which from the SM-unit extend to the IU-unit, in consequence of which in the last mentioned unit two of the 8 flip-flops RF1–RF8 are activated and remain activated until they are restored during the fourth period. The signal registered in said flip-flop is fed to the core memory in which it is stored until read-out is necessary. The core memory RM consists of a matrix of the ferrite cores from a 0-state can be brought to a 1-state and said record can be read out and written in during each register scanning pulse until cancellation of the record is carried out.

FIG. 6*a* shows diagrammatically a row of 8 magnetic cores in the register memory. Through each core K extend two horizontal wires and one vertical wire. The core can be brought from the 0-condition to the 1-condition by feeding half of the current necessary for switching both to the vertical and the horizontal wires. The core is brought to the 0-condition by connecting a read out current to the vertical wire, in consequence of which a pulse is obtained through the horizontal read out wire in known manner. A bistable flip-flop FF is associated with each horizontal row. When the flip-flop is in the 1-condition, the half value write current is fed through the horizontal write wire, then the flip-flop is in the 0-condition, no writing can be carried out. The output current of the flip-flop is fed through an amplifier WA to the write wire which is conducting only during the 3rd period in dependence on the function of the gate circuit GR. A current flows through the vertical wire during the first and the third period as indicated diagrammatically.

In FIG. 6*b* the condition of the core and of the flip-flop during a number of subsequent pulse positions for a definite column, i.e. a register, is diagrammatically shown. If there is no record in the core, i.e. the core is in the 0-condition, no read out current is obtained and the flip-flop FF maintains its 0-condition. Consequently no re-writing can be carried out during the third period. If the flip-flop is operated during the second period, so that it is set in the 1-condition, it will feed half the value of the write current to the horizontal write wire during the third period so that the core will be brought to the 1-condition. During the fourth period the flip-flop is restored to the 0-condition but the record remains in the core so that during the first period of the next cycle a read out pulse will be obtained from the core to the flip-flop, and consequently the flip-flop will be brought to the 1-condition so that re-writing can be carried out during the third period. The core can of course be brought to the 1-condition by feeding a half current value to the write wire through the amplifier WA during the third period.

As mentioned before the matrix consists of 8 columns corresponding to the 8 register pulse positions (FIG. 5*a* or 5*b*). 8 rows (1 cell) are used to register each of the digits in a code 2×1 of 4 signals, i.e. altogether 40 bits for 5 digits, 7 bits are used for the cell control, i.e. for controlling the feeding in and out of the digits in correct order to and from the respective cells. Furthermore there is a number of further rows for recording the different control functions, e.g. recording that sending has begun, proceed signal has been obtained and so on as will be explained below.

When a subscribed calls, flip-flop OIF in the IU-unit is operated in the register pulse position (FIG. 5*a*) pertaining to the respective memory group. As a result flip-flop OCF is activated through the wire 11 and by means of an AND-circuit SC, the other input of which is activated during the third period, it allows the opening of the gate circuit WG during said period, so that a re-writing into the column belonging to said register pulse position can be carried out. On the other hand by bringing the flip-flop OIF to the 1-condition core K141 is set in the 1-state (if the first of the 8 register pulse positions is used) through the AND-circuit AIC4 and the wire 101 as a sign that the first digit may be received. This record remains in the core the whole time, with other words it is re-written all the time during the 3rd period until it is cancelled by preventing re-writing.

The cell control circuit CS, i.e. the control of the feeding in and out of the information to and from the cores, comprises 6 bistable flip-flops CA1–CA6 and 6 AND-circuits APC1–APC6 co-operating with the same. When the flip-flop FF41 is brought to the 1-condition through the wire 101, also the pertinent flip-flop CA1 is brought to the 1-condition and the latter in turn operates, through the wire 111, the AND-circuits CSR1–SCR8 in the LK-unit so that the signals received from the flip-flops RF1–RF8 through the wires 1–8 can be led to the first 8 rows, i.e. the first cell for writing in information by allowing the flip-flops FF1–FF8 to be set in the 1-condition. By DCC1 is designed as a monostable circuit which, as long as the circuits RF1–RF8 sense the digit signal, produces an output signal through wire 25, so that an inhibiting circuit AIC3 is blocked. As soon as the signal from DCC1 ceases, the inhibiting circuit AIC3 will become conducting, and consequently the AND-circuit APC1, the other input of which is connected to the flip-flop CA1, is activated and it will feed a signal to the core K142 at the same time as the signal from AIC3 brings the flip-flop FF41 to the 0-condition. From the flip-flop CA2 the AND-circuits CSR9–16 are operated through wire 112, so that the next digit signal received is fed through the wires 209–216 to bits 9–16 in the core memory. This will continue in the same manner until the last digit, according to the embodiment the 5th, has been received. Now the circuit APC5 will become conducting and a record is registered in the bit 46. Due to this a signal is obtained through the wire 116 to one of the inputs of the AND-circuit CSC, the other input of which obtains a signal during the second period, so that bit 58 may be set to 1 through the wire 38. The 1-condition of core K158 implies that sending can begin. Through wire 38 flip-flop SAF in the IU-unit is also activated thus sending said calling signal consisting of the frequency 2400 Hz. to called exchange.

In the receiving exchange (FIG. 5*b*) the inhibiting circuit KFC will be conducting due to the fact that on one hand it obtains a signal from circuit AIC4 when circuit OIF is activated upon obtaining the calling signal, on the other hand inhibition is nullified, e.g. by means of the marker of the exchange, if calls come from another exchange. In the same manner as when the register of the sending exchange has received digit signals from the calling subscriber, writing is carried out through the wire 11, circuit AIC4 and the wire 101 in core 141 (supposing for the sake of simplicity that also in the receiving register the first pulse position has been idle) which indicates that the first digit can be received and directed to the first cell. Activation of circuit KFC causes circuits CDD11 and CDD16 to be activated. This implies activation of flip-flops SF3 and SF8 in the IU-unit and consequently of the gate circuits SG3 and SG8 in the SM-unit. A digit code 15 consisting of the frequencies 1260 and 1980, in the following called ready signal or R-signal, is sent to the sending register.

When the sending register (FIG. 5*a*) receives the ready signal, the sending of the seizing signal ceases due to the restoring of SAF to 0-condition. This occurs when the R-signal is detected by means of circuits DCC3 and DCC8 which influence the AND-circuit RRF, which in turn, through wire 42, switches core K159 to 1-condition as a sign that ready signal has been received. Through wire 42 the flip-flop SRF in the IU-unit is activated, so that the calling signal ceases. Upon activation of circuit RRF circuit APC6 in SC also obtains a signal through wire 42, so that circuit APC6 will conduct due to the fact that its other input is activated through wire 116 from core 146. Through wire 101 core 141 is brought to the 1-condition in order to enable the sending of the first digit. Due to the fact that through wire 111 a signal is conducted to circuits CSS1–8 in the LK-unit, so that the same are deblocked, the signal obtained from the memory through the wires 301–308 can operate the voice frequency senders. Suppose that e.g. the first digit is 3; circuits CCS1 and CCS7 and consequently circuits DC9 and DC15 in the unit KS will be operated and the flip-flops SF1, SF7 in unit IU will be operated, so that digit 3 is sent.

The digit 3 is received and stored in the receiving register (FIG. 5*b*) in the same manner as has been described in connection with digit sending from the subscriber to the register. When DCC1 is operated the first time in the receiving register, the flip-flop circuit SRF is also activated through wire 25. Consequently all the flip-flops are set to zero in the SR-unit, so that the sending of the R-signal ceases. The digit signal received operates circuits DCC1, DCC7 in the receiving register corresponding to digit 3. The outputs of circuits DCC1–DCC8 are connected to the inputs of circuits DCC9–DCC16 in such a manner that the first, second, third and fourth circuit respectively in the first group is connected with the fourth, third, second and the first circuit respectively in the second group and the fifth, sixth, seventh and eigth circuit respectively in the first group is connected with the eight, seventh, sixth and fifth circuit respectively in the second group. In this manner a complement signal is obtained, the frequencies of which, in the respective 4-groups, are situated as far from one end of the frequency series as was the original signal from the other end of the frequency series. For the digit signal 3 which consists of the first frequency in the first 4-group and the third frequency in the second 4-group, the acknowledgment signal will consist of the fourth frequency in the first 4-group and the second frequency in the second 4-group, i.e. the digit 0 according to the table. Said complement signal is sent by means of the flip-flops SF1–SF8 according to the embodiment, the flip-flops SF4 and SF6 corresponding to digit 0.

The complement signal is received in the sending register (FIG. 5*a*), in which it is led through the units SM and OI and through the wires 131–138 to the AND-circuits CCC1–CCC8. A further input of said circuits is connected to the output of the circuits DCC9–DCC16, through which the sending of the digit signal proceeds. Thus in sending the digit 3 one of the inputs of the circuits CCC1 and CCC7 are activated while the other input of said circuits is activated by the acknowledgment signal 0, i.e. the fourth and the sixth frequency. The condition that one of the circuits CCC1–CCC8 should be activated, is consequently that said circuit obtains on one hand the signal forming the digit signal, on the other hand simultaneously obtains the acknowledgment signal within the same 4-group of frequencies. When e.g. sending the digit 3, the inputs of the circuits CCC1 and CCC7 are activated, while the other input of said circuits is activated by the acknowledgment signal 0 consisting of the fourth and the sixth frequency. If one of the circuits CCC1–CCC4 as well as one of the circuits CCC5–CCC8 has been operated, this implies that the acknowledgment digit has been recived correctly, i.e. the digit has been received correctly in the receiving register. The OR-circuits CCC9A and CCC9B respectively are operated as a result of the outputs from the respective 4-groups, so that AND-circuit CCC9C is also operated. From the output of circuit CCC9C the flip-flop SRF is operated through the wire 48, therefore causing the sending of the signal to cease. By means of the same wire 48 core K160 is activated, so that circuits CSS1–40 cannot be activated any more through the circuit CSS6, the inhibiting condition of which is obtained from the flp-flop FF60 through the wre 48. Consequently further information is prevented from being sent in the forward direction also if the acknowledgment signal and thus the signal from the circuit CCC9C should cease.

When the receiving register (FIG. 5b) detects that sending of the signal has ceased, circuit DCC1 will be inactive, the inhibiting of circuit AIC3 ceases through the wire 25, so that the other input of the AND-circuit APC1 is activated, and therefore the cell address of the second digit is written into core K142 through the wire 102. This implies that the next digit signal received will be fed to cell B, i.e. the cores K109–116. A signal has to be sent to the sending register as a sign that the sending can continue. Bit 47 is activated through wire 37 upon activation of the circuit AIC3. In this manner the cell address will be prevented from changing by inhibiting the circuit AIC3 through the wire 31 before a new digit has been received and stored. Through wire 28 from the output of the circuit AIC3 flip-flop SRF is activated, so that the acknowledgment signalling ceases. Upon activation of flip-flop FF47 two circuits DCC12 and DCC16 in the KS-unit are operated through the wire 37, which implies that the progress signal P consisting of the fourth and the eighth frequency, the digit 16, is sent to the sending register.

As soon as the sending register (FIG. 5a) has detected the progress signal, the AND-circuit PC is operated, the flip-flop PRF is set to 1-condition and through the wire 28 the other input of the APC1-circuit is activated so that cell address B, for sending of the second digit, is written into the core K142. The second digit can now be sent through the circuit CSS9–CSS16.

Upon receiving the second digit the receiving register (FIG. 5b) ceases to send the P-signal and begins to send the complement.

The sending register (FIG. 5a) reacts exactly in the same manner as upon receiving of the complement of the first digit signal and the cell address is changed to C so that the third digit can be sent When all the digits have been sent and received respectively, the marker is called in order to set up the connection.

FIG. 7 shows diagrammatically the signalling process. As may be seen, first the calling signal *Anr* is sent from the sending register R1 to the receiving exchange R2. After the calling signal has been received and R2 has been connected, the latter sends ready signal R to the sending register. After the sending register R1 has received the R-signal, the sending of the first digit signal A begins. The receiving register now sends the complement signal A'. After receipt of the A'-signal the sending of the A-signal ceases. When the sending of the A-signal ceases, the receiving register acts in such a manner that it sends the progress signal P. After receipt of the progress signal, R1 sends the next digit B and the operation continues until the last digit E has been sent. After receipt of the last digit, register R2 sends an end signal S, the complement signal of which, S' is sent back to R2. Receipt of the end signal S and of its acknowledgment respectively causes disconnection of registers R1 and R2 respectively. The operation is the same when the signalling is carried out through one or more intervening exchanges.

We claim:

1. A circuit system for supervising the reception of digits representing signals in a telephone system, said circuit system comprising a first register including signal-transmitting means for sending digit-representing signals, said signals including combinations of at least two distinct voice frequencies and being grouped in at least two groups of frequencies having different frequency ranges, an equal number of frequencies being located on opposite sides of a symmetry line in the frequency spectrum of the respective range, and a second register including means for receiving said signals and revertive means for sending back to said first register signals consisting of combinations of voice frequencies in which each of said distinct frequencies in the respective range has the same sequence number in reference to the respective symmetry line as in the received signal, but in the opposite sense of the voice spectrum.

2. A circuit system according to claim 1 wherein said first register further comprises means for forming from the signals sent back from the second register to the first register signals in which said distinct voice frequencies are again reversed in reference to the respective symmetry line, thereby reconstructing the originally sent signals, means for comparing said reconstructed signals with the originally sent signals, and means controlled by said comparison and controlling the sending of signals by said signal-transmitting means so that the original signals and the reconstructed signals are substantially equal.

References Cited by the Examiner

UNITED STATES PATENTS

| | | | |
|---|---|---|---|
| 2,056,265 | 10/1936 | Germanton | 179—18 |
| 2,807,671 | 9/1957 | Warman | 179—18 |
| 2,904,636 | 9/1959 | McKim et al. | 179—18 |

ROBERT H. ROSE, *Primary Examiner.*

WALTER L. LYNDE, *Examiner.*